United States Patent
Tsai

(10) Patent No.: US 10,535,110 B2
(45) Date of Patent: Jan. 14, 2020

(54) METHOD AND DEVICE FOR AUTOMATIC COMPUTER TRANSLATION OF PATENT CLAIMS

(71) Applicant: INTEGRAL SEARCH TECHNOLOGY LTD., Taipei (TW)

(72) Inventor: Hong-Shin Tsai, Taipei (TW)

(73) Assignee: INTEGRAL SEARCH TECHNOLOGY LTD., Taipei (TW)

(*) Notice: Subject to any disclaimer, the term of this patent is extended or adjusted under 35 U.S.C. 154(b) by 120 days.

(21) Appl. No.: 15/468,003

(22) Filed: Mar. 23, 2017

(65) Prior Publication Data

US 2018/0157649 A1    Jun. 7, 2018

(30) Foreign Application Priority Data

Dec. 5, 2016   (TW) .............................. 105140048 A

(51) Int. Cl.
*G06F 17/28* (2006.01)
*G06Q 50/18* (2012.01)

(52) U.S. Cl.
CPC .................................. *G06Q 50/184* (2013.01)

(58) Field of Classification Search
CPC .... G06F 17/289; G06F 17/28; G06F 17/2735; G06F 17/2854; G06F 17/2872; G06F 17/277; G06F 17/2836; G06F 17/2827; G06F 16/3337; G06F 16/24522; G06F 17/2775; G06F 9/454

USPC ............................... 704/1–10, 230–257, 277
See application file for complete search history.

(56) References Cited

U.S. PATENT DOCUMENTS

| | | | |
|---|---|---|---|
| 2005/0004806 A1 | 1/2005 | Lin et al. | |
| 2007/0150260 A1* | 6/2007 | Lee ..................... | G06F 17/2818 704/2 |
| 2009/0063427 A1* | 3/2009 | Zuta .................... | G06F 17/2795 |
| 2010/0145940 A1 | 6/2010 | Chen et al. | |
| 2013/0198092 A1 | 8/2013 | Dugan et al. | |
| 2013/0198182 A1* | 8/2013 | Drawid ............. | G06F 17/30286 707/736 |
| 2014/0156255 A1* | 6/2014 | Le Chevalier .... | G06F 17/30563 704/2 |
| 2015/0293932 A1 | 10/2015 | Takeda et al. | |

FOREIGN PATENT DOCUMENTS

| | | |
|---|---|---|
| TW | 200506655 A | 2/2005 |
| TW | 200630827 A | 9/2006 |
| TW | 201022963 A | 6/2010 |
| TW | 201500939 A | 1/2015 |
| TW | I522825 B | 2/2016 |
| TW | I537863 B | 6/2016 |
| TW | I550422 B | 9/2016 |

* cited by examiner

*Primary Examiner* — Huyen X Vo
(74) *Attorney, Agent, or Firm* — Maschoff Brennan

(57) ABSTRACT

The invention disclosed relates to a claim automatically computer-translating device, comprising: a fundamental element noun capturing unit, a definition capturing unit, and a data translation unit, for automatically computer-translating a first language claim into a second language claim.

8 Claims, 3 Drawing Sheets

| Definition | |
|---|---|
| a deformable section | defining a deformable section contact surface |
| Fundamental Element Noun Data | Definition Description Data |

FIG.2a

| | Definition | |
|---|---|---|
| | a contact surface | said contact surface | being formed to have a contact hole |
| deforming | Element Noun Data | Beginning Element Noun Data | Remaining Definition Description Data |
| Operating Description Data (Ving) | Fundamental Element Noun Data | Definition Description Data | |

FIG.2b

| Definition | said deformable section contact surface | being deformable between an undeformed configuration and a deformed configuration | Remaining Definition Description Data |
|---|---|---|---|
| | Beginning Element Noun Data | | |
| | Definition Description Data | | |
| Fundamental Element Noun Data | | | |

*FIG.2c*

| Definition | said deformed configuration | being achievable when said deformable section contact surface is abutted against and biased toward said object | Remaining Definition Description Data |
|---|---|---|---|
| | Beginning Element Noun Data | | |
| | Definition Description Data | | |
| Fundamental Element Noun Data | | | |

*FIG.2d*

METHOD AND DEVICE FOR AUTOMATIC COMPUTER TRANSLATION OF PATENT CLAIMS

FIELD OF THE INVENTION

The present invention relates to a computer-translating device and, more particularly, to a claim automatically computer-translating device that can use a computer to automatically translate a patent claim.

BACKGROUND OF THE INVENTION

Claims of a patent are not only difficult to understand for the general public but also sometimes are complicate for patent specialists including patent examiners, patent attorneys and patent agents. Especially it is even harder for people to understand a claim in foreign languages. Therefore, a translation of claims with high translating accuracy is required. Accordingly, a computer translation of a patent specification including claims has been applied in the field of intellectual property for the translation. However, in spite that the computer translation has been improving with the advance of technology, the computer translation such as Google translation, Dr. eye, etc. for translating a patent specification including a claim is still not practical. The reason is that a relationship definition of a subject and an object in a claim is generally expressed by a passive form such that when there are a plurality of passive forms defined in the same sentence, the computer is always confused to the relationship in connection to the subject and the objects. The confusion leads to an incorrect result.

However, the inventor of the present invention has found that the special form which a patent claim is drafted can be applied to provide a translated result with a very high percentage of accuracy by dividing one claim as a plurality of divided sections, and translating the divided sections respectively by a computer. In other words, the inventor of the present invention has found the translated result is excellent if one claim is divided into a plurality of divided sections, and the divided sections are then respectively translated by a computer in the same sequence as the original claims to obtain translated claims with very high translation accuracy.

SUMMARY OF THE INVENTION

Therefore, one of the objectives of the present invention is to provide a claim automatically computer-translating device that can improve accuracy in the claim translation to rapidly obtain the correct translated results by only dividing the contents of the claim into individual segments and then translating in original sequence one segment after another segment. Moreover, since the contents divided into segments is with a format easy to read, the translated result divided with the easy reading format can be a more readable translation.

In order to achieve the effect mentioned above, the present invention provides a claim automatically computer-translating device for automatically computer-translating a first language claim into a second language claim, comprising:

a fundamental element noun capturing unit that captures a fundamental element noun in the first language claim to obtain fundamental element noun data, the fundamental element noun data being obtained based on element noun data, the element noun data being obtained by capturing a element noun from the first language claim, the fundamental element noun data being the element noun data when the first language claim is a product claim, and the fundamental element noun data being a combination of the element noun data and an operating description data preceding the element noun data when the first language claim is a method claim in such a manner that the fundamental element noun data is formed in a sequence that the operating description data is followed by the element noun data.

a definition capturing unit that captures a definition description from the first language claim to obtain definition description data; and a data translation unit that separately translation the fundamental element noun data obtained by the fundamental element noun capturing unit and the definition description data obtained by the definition capturing unit such that a translated fundamental element noun data and a translated definition description data are obtained to form the second language claim.

In the claim automatically computer-translating device according to one embodiment of the present invention, the translation of the translated definition description data is performed by separately translating a beginning element noun data and the remaining definition description data when the beginning of the definition description data is the beginning element noun data so as to automatically computerized-translate the definition description data into the translated beginning element noun data and the translated remaining definition description data.

In the claim automatically computer-translating device according to one embodiment of the present invention, the second language claim is formed in a sequence that the translated definition description data follows the translated fundamental element noun data.

In the claim automatically computer-translating device according to one embodiment of the present invention, the fundamental element noun data is directly followed by the definition description data so as to correspond to the fundamental element noun and to define the fundamental element noun.

In the claim automatically computer-translating device according to one embodiment of the present invention, the translated fundamental element noun data and the translated definition description data are formed by manners including being spaced apart to each other, line feeding to each other, and combining together so as to form the second language claim.

In the claim automatically computer-translating device according to one embodiment of the present invention, the definition capturing unit captures the element noun on a basis of the element noun according to part of speech relationship to obtain the element noun data.

In the claim automatically computer-translating device according to one embodiment of the present invention, the translated fundamental element noun data and the translated definition description data are stored and used for a patent searching.

According to one embodiment of the present invention, the claim automatically computer-translating device further comprises a display unit that displays the obtained second language claim.

By the claim automatically computer-translating device of the present invention, a claim with a complicated grammatical relationship and with correlated relationship in connection to the subjects and the objects are divided into a plurality of divided sections with the same sequence as the original claim, and the sequential divided sections are then provided to an automatic translating computer for the translation. Since each divided section is with a simpler form as compared with that of the original claim, the translated results become more accurate. Moreover, a user can obtain the translated results with the same sequence as the original claim such that the comparison between the translated result and the original claim can be easier. In addition, the form obtained by the dividing process of the present invention can be re-used to obtain even an easier translating result.

BRIEF DESCRIPTION OF THE DRAWINGS

FIGS. 2a to 2d are drawings illustrating a data structure of the claim automatically computer-translating device according to one embodiment of the present invention.

DETAILED DESCRIPTION OF THE PREFERRED EMBODIMENTS

Figure 1:
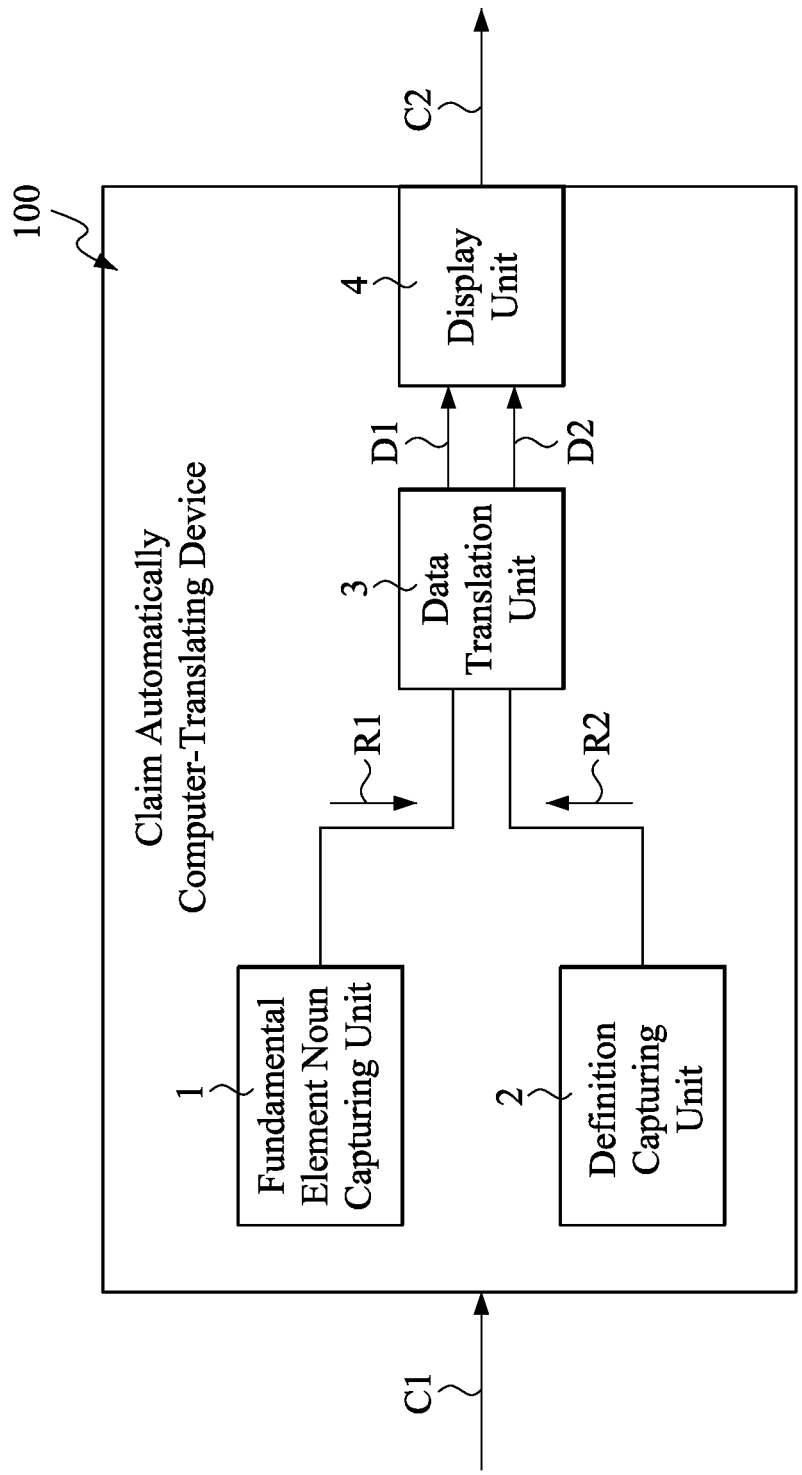
FIG. 1 is a block diagram showing a claim automatically computer-translating device according to one embodiment of the present invention.

The preferred embodiment of the present invention is described in detail below. The description is used for explaining the embodiments of the present invention only, but not for limiting the scope of the claims.

A claim of patent includes a claim preamble and a claim body. The following embodiment describes a claim translation from English to Chinese, but the present invention is not limited to this. The translation from English to any other languages is available for the present invention. The claim body as an example in the embodiment is as follows.

"a deformable section defining a deformable section contact surface, said deformable section contact surface being deformable between an undeformed configuration and a deformed configuration, said deformed configuration being achievable when said deformable section contact surface is abutted against and biased toward said object;"

The above claim body not processed by the present invention is translated to Chinese as follows.

"'可變形部分接觸表 面可在未變形構造 和變形構造之間變 形，所述變形構造可在所 述可變形部分接觸 表面抵靠所述物體 並朝向所述物體偏置時實現'".

The above Chinese can be read with English meaning as follows.

"a deformable section contact surface being deformable between an undeformed configuration and a deformed configuration, said deformed configuration being, when said deformable section contact surface is abutted against and biased toward said object, achievable;"

It is noted that the claim not processed by the present invention is translated by the prior computer-automatically-translating device to obtain a translated result that ignores the translation for "a deformable section defining a deformable section contact surface," probably since the definition of "a deformable section contact surface," is then detailed defined thereafter. In other words, the translated result of the claim not processed by the present invention mistakenly deletes the translation for the definition with a word "defining" if an element noun existing neighboring to the word "defining" has been immediately defined after the word "defining". This abbreviation causes an unpredictable mistake, which is not allowable in the translation of a patent claim.

It is further noted that the claim not processed by the present invention is translated by the prior computer-automatically-translating device to obtain a translated result that puts the translated word "achievable" after the definition of ", when said deformable section contact surface is abutted against and biased toward said object,". This translation will also cause a confusion to understand the meaning of claim. When there are a plurality of objects, participles and subjects in the claim, a computer-automatically translating device will tend to confuse the relationship thereamong. The exemplary claim shown above is only a simpler claim, which is with a comparative easier structure having only one participle in one definition section. The other examples of claims having more than one participles in one definition section will cause the prior computer-automatically-translating device to obtain a result whose subject, object and connecting relation are disordered.

In addition to above, the translated result in language other than English, such as Chinese or Japanese, has a problem that the structural arrangement of the translated result is difficult, since there is not a space between neighboring two words and the recognition of words becomes very difficult.

The present invention is able to solve the above problems. The inventor of the present invention utilizes a feature of claim that one definitions of claim contains a fundamental element noun and a definition description. The follows takes the above element definition block, which is defined in a device claim, as an example. As shown in FIG. 2a, the definition of "a deformable section defining a deformable section contact surface" is with a fundamental element noun as "a deformable section" and a definition description as "defining a deformable section contact surface". And, regarding a method claim as shown in FIG. 2b, the definition of "deforming a contact surface, said contact surface being formed to have a contact hole" is with a fundamental element noun of "deforming a contact surface" and a definition description of "said contact surface being formed to have a contact hole".

In order to more accurately translate the definition description in a method claim, the present invention performs a further dividing operation for the definition description of a method claim. As shown in FIG. 2b, an element noun existing in the beginning of a definition description is referred to as a beginning element noun, and other portion of the definition description is referred to as "the remaining definition description". As shown in FIG. 2c, in the definition description of "said deformable section contact surface being deformable between an undeformed configuration and a deformed configuration," is with an fundamental element noun as "said deformable section contact surface" and a definition description of "being deformable between an undeformed configuration and a deformed configuration". And, regarding a method claim as shown in FIG. 2d, the definition description of "said deformed configuration being achievable when said deformable section contact surface is abutted against and biased toward said object" is with an fundamental element noun as "said deformed configuration" and a definition description as "being achievable when said deformable section contact surface is abutted against and biased toward said object". The determination of "fundamental element noun", "beginning element noun", and "the remaining definition description" is performed depending on a part-of-speech relationship. The part-of-speech relationship is a mechanism that performs the follows.

(1) identifying a noun beginning word such as "a", "the" and "said" to determine a starting position of a noun, such as the fundamental element noun or the beginning element noun;

(2) determining an end of the noun by using a noun determining rule according to the part of speech of the words defined after the noun beginning word, wherein the part of speech of the words includes the part of speech of subordinating verb (such as "is" and "being"), preposition (such as "to"), relative pronoun (such as "which"), thereby determining a noun (such as the fundamental element noun or the beginning element noun); and (3) determining the portion other than the noun in the element definition block as "the definition description". The related determining processes above can be found in Taiwanese granted Patent No. 1550422. Therefore, the detailed description thereof is omitted.

As shown in FIG. 1, a claim automatically-computer-translating device 100 automatically translates a first language claim C1 into a second language claim C2. In one embodiment, the first language claim C1 is, for example, in English and the second language claim C2 is, for example, in Chinese.

The claim automatically-computer-translating device 100 includes: a fundamental element noun capturing unit 1 that captures a fundamental element noun in the first language claim C1 to obtain fundamental element noun data R1, the fundamental element noun data R1 being obtained based on element noun data, the element noun data being obtained by capturing a element noun, the fundamental element noun data R1 being the element noun data when the claim is a product claim, and the fundamental element noun data R1 being a combination of the element noun data and an operating description data preceding the element noun data when the claim is a method claim.

A definition capturing unit 2 captures a definition description from the first language claim C1 to obtain definition description data R2. In the present invention, the determination whether one claim is a device claim or a method claim is performed based on a specific form of a method claim, such as "A method for . . . " or "A Verb+ing (e.g. manufacturing) method of . . . ", whose detail can be found in Taiwanese granted Patent No. 1522825.

As an example, the fundamental element noun capturing unit 1 of the claim automatically computer-translating device 100 in the present invention captures "a deformable section" as a fundamental element noun from the definition of "a deformable section defining a deformable section contact surface" which is shown in FIG. 2a, and determines that the claim is a product claim. Therefore, the captured element noun data "a deformable section" is determined as fundamental element noun data R1.

The definition capturing unit 2 of the claim automatically-computer-translating device 100 in the present invention captures "defining a deformable section contact surface" as the definition description data R2 from the definition of "a deformable section defining a deformable section contact surface" which is shown in FIG. 2a.

In the example of a method claim, as shown in FIG. 2b, the fundamental element noun capturing unit 1 captures the element noun data "a contact surface" from "deforming a contact surface, said contact surface being formed to have a contact hole" and determines that the claim is a method claim. Thereafter, the element noun data "a contact surface" is captured to combine with an operating description data "deforming" defined before in such a manner that the fundamental element noun data R1 "deforming a contact surface" is formed in a sequence that the operating description data "deforming" is followed by the element noun data "a contact surface". In addition, as shown in FIG. 2b, the definition capturing unit 2 captures "said contact surface being formed to have a contact hole" as definition description data R2 from the definition of "deforming a contact surface, said contact surface being formed to have a contact hole".

In the above-described manner, the fundamental element noun data R1 obtained by the fundamental element noun capturing unit 1 and the definition description data R2 obtained by the definition capturing unit 2 are transmitted to a data translation unit 3 such that the data translation unit 3 respectively translates the fundamental element noun data R1 and the definition description data R2 into a translated fundamental element noun data D1 and a translated definition description data D2. As shown in FIG. 2a, as the fundamental element noun data R1 is "a deformable section" and the definition description data R2 is "defining a deformable section contact surface", the fundamental element noun data R1 "a deformable section" and the definition description data R2 "defining a deformable section contact surface" are respectively translated into a translated fundamental element noun data D1 (i.e., "變形 部分" in Chinese) and a translated definition description data D2 (i.e., "限定了變形部分 接觸表面" in Chinese).

As shown in FIG. 2b, when the fundamental element noun data R1 is "deforming a contact surface" and the definition description data R2 is "said contact surface being formed to have a contact hole", the fundamental element noun data R1 and the definition description data R2 are respectively translated into a translated fundamental element noun data D1 and a translated definition description data D2. As described above, for the purpose of more precisely translating the definition description R2, when the beginning of the definition description R2 is a beginning element noun "said contact surface" in the definition description R2 "said contact surface being formed to have a contact hole" as shown in FIG. 2(b), the beginning element noun data ("said contact surface") and the remaining definition description data R2 ("being formed to have a contact hole") are respectively translated into "所述接觸表面" and "形成為具有接觸孔". Furthermore, in the definition description R2 "said deformable section contact surface being deformable between an undeformed configuration and a deformed configuration" shown in FIG. 2(c), the beginning element noun data "said deformable section contact surface" and the remaining definition description data R2 "being deformable between an undeformed configuration and a deformed configuration" are respectively translated. Moreover, in the definition description R2 "said deformed configuration being achievable when said deformable section contact surface is abutted against and biased toward said object" as shown in FIG. 2(d), the beginning element noun data "said deformed configuration" and the remaining definition description data R2 "being achievable when said deformable section contact surface is abutted against and biased toward said object" are respectively translated.

In the present invention, as shown in FIG. 2a, the second language claim C2 is obtained by a combination in a sequence that the translated definition description data D2 follows the translated fundamental element noun data D1. That is, as shown in FIG. 2a, the second language claim C2 is formed in a sequence of "變形部分" followed by "限定了變形部分 接觸表面", and in a sequence "使接觸表 面變形", "所述接觸表面", and "形成為具有接觸孔" as shown in FIG. 2b.

The translated fundamental element noun data D1 and the translated definition description data D2 may be one or a plurality ones. The present invention displays the translated second language claim C2 with the same spacer, line feeding and combination as that in the translated first language claim C1 regarding the translated fundamental element noun data D1 and the translated definition description data D2. Therefore, it increases the readability of the translated second language claim C2.

As illustrated in FIG. 2a, the definition description data R2 "defining a deformable section contact surface" is defined as adjacently following the fundamental element noun R1 "a deformable section", and the definition description data R2 "defining a deformable section contact surface" is with a corresponding relationship to the fundamental element noun R1 "a deformable section" so as to define the fundamental element noun R1. However, the definition description data R2 may not be directly corresponding to any fundamental element noun R1, but is only a supplementary description.

In the present invention, the fundamental element noun capturing unit 1 uses part of speech relationship to capture the element noun to obtain the fundamental element noun. The definition capturing unit 2 uses part of speech relationship to capture the definition description to obtain the definition description data R2. The related explanation can be found in Taiwanese granted patent No. 1522825, so the relevant details will be omitted.

The translated fundamental element noun data D1 and the translated definition description data D2 obtained by the present invention are stored for other purpose such a patent searching. As a result, a user can use transnational languages to perform a patent searching to obtain a claim by determining a position of targeting claim such that the accuracy of patent searching can be achieved.

The second language claim C2 formed by the translated fundamental element noun data D1 and the translated definition description data D2 of the present invention is displayed by a display unit 4, as shown in FIG. 1.

The following is a further example as a reference.

First language claim C1:

"a deformable section, said deformable section defining a deformable section contact surface, said deformable section contact surface being deformable between an undeformed configuration and a deformed configuration, said deformed configuration being achievable when said deformable section contact surface is abutted against and biased toward said object."

is divided as divided sections as follows:
(1) a deformable section,
(2) said deformable section
(3) defining a deformable section contact surface,
(4) said deformable section contact surface
(5) being deformable between an undeformed configuration and a deformed configuration,
(6) said deformed configuration
(7) being achievable when said deformable section contact surface is abutted against and biased toward said object.

The above divided sections are sequentially arranged and are then respectively translated in the same sequence. The translated fundamental element noun data D1 and the translated definition description data D2 are also displayed with the same spacers, line feeding and combining relationship as that before the translation.

The result of the translation in Chinese is:

可變形部分,
所述變形部分
限定變形部分 接觸表面,
所述變形部分, 接觸表面
能夠在未變形構造 和變形構造之間變形,
所述變形構造
當所述變形部分接 觸表面抵靠所述物 體並朝向所述物體 偏置時可實現.

The translated result is much more accurate and is with an easy-to-read format.

The above description is only an explanation of the preferred embodiments of the present invention. One having ordinary skill in the art can make various modifications according to the above description and the claims defined below. However, those modifications shall still fall within the scope of the present invention.

What is claimed is:

1. A computer-translating device for automatically computer-translating a first language claim into a second language claim, comprising:
    a fundamental element noun capturing unit that captures a fundamental element noun in the first language claim to obtain fundamental element noun data, the fundamental element noun data being obtained based on element noun data, the element noun data being obtained by capturing a element noun from the first language claim, the fundamental element noun data being the element noun data when the first language claim is a product claim, and the fundamental element noun data being a combination of the element noun data and an operating description data preceding the element noun data when the first language claim is a method claim in such a manner that the fundamental element noun data is formed in a sequence that the operating description data is followed by the element noun data;
    a definition capturing unit that captures a definition description from the first language claim to obtain definition description data; and
    a data translation unit in data connection with the fundamental element noun capturing unit and the definition capturing unit to individually take each fundamental element noun data as one translation unit and to individually take each definition description data as another translation unit such that the data translation unit individually translates, by utilizing a computer translation the fundamental element noun data obtained by the fundamental element noun capturing unit and the definition description data obtained by the definition capturing unit on the basis of sequential position relation between each fundamental element noun data and each definition description data in the first language claim without altering a sequential positional relation between fundamental element noun data and definition description data in the first language claim and without mixing each translation unit to obtain the fundamental element noun data translated and the definition description data translated to form the second language claim.

2. The computer-translating device of claim 1, wherein the translation of the translated definition description data is performed by separately translating a beginning element noun data and the remaining definition description data when the beginning of the definition description data is the beginning element noun data so as to automatically computerized-translate the definition description data into the translated beginning element noun data and the translated remaining definition description data.

3. The computer-translating device of claim 1, wherein the second language claim is formed in a sequence that the translated definition description data follows the translated fundamental element noun data.

4. The computer-translating device of claim 3, wherein the translated fundamental element noun data and the translated definition description data are formed by manners including being spaced apart to each other, line feeding to each other, and combining together so as to form the second language claim.

5. The computer-translating device of claim 1, wherein the fundamental element noun data is directly followed by the definition description data so as to correspond to the fundamental element noun and to define the fundamental element noun.

6. The computer-translating device of claim 1, wherein the definition capturing unit captures the element noun on a basis of the element noun according to part of speech relationship to obtain the element noun data.

7. The computer-translating device of claim 1, wherein the translated fundamental element noun data and the translated definition description data are stored and used for a patent searching.

8. The computer-translating device of claim 1 further comprising a display unit in data connection with the data translation unit to display the obtained second language claim.

* * * * *